(12) United States Patent
Lin et al.

(10) Patent No.: US 8,687,963 B2
(45) Date of Patent: Apr. 1, 2014

(54) METHOD, SYSTEM AND DEVICE FOR OPTICAL NETWORK TERMINATION CONFIGURATION

(75) Inventors: Wei Lin, Shenzhen (CN); Sulin Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 923 days.

(21) Appl. No.: 12/761,206

(22) Filed: Apr. 15, 2010

(65) Prior Publication Data

US 2010/0196006 A1 Aug. 5, 2010

Related U.S. Application Data

(63) Continuation of application No. PCT/CN2008/072737, filed on Oct. 17, 2008.

(30) Foreign Application Priority Data

Oct. 17, 2007 (CN) .......................... 2007 1 0123951

(51) Int. Cl.
*H04J 14/00* (2006.01)
(52) U.S. Cl.
USPC .................... 398/72; 398/71; 398/67; 398/66; 398/63
(58) Field of Classification Search
CPC .................. H04B 10/25753; H04B 10/25754; H04B 10/25755; H04B 10/25756; H04B 10/25758; H04B 10/25752; H04B 10/25751; H04B 10/27; H04B 10/271; H04B 10/272; H04B 10/2755; H04B 10/275; H04B 10/278; H04J 14/0279; H04J 14/028; H04J 14/0282; H04J 14/0284; H04J 14/0286
USPC ............ 398/72, 71, 70, 69, 67, 66, 63, 61, 58
See application file for complete search history.

(56) References Cited

U.S. PATENT DOCUMENTS

| 2006/0228113 A1 | 10/2006 | Cutillo et al. |
| 2007/0133800 A1 | 6/2007 | Kim et al. |
| 2007/0263656 A1* | 11/2007 | Niu et al. ...................... 370/465 |
| 2007/0274722 A1* | 11/2007 | Zhao et al. ..................... 398/71 |

FOREIGN PATENT DOCUMENTS

| CN | 1674471 A | 9/2005 |
| CN | 101047445 A | 10/2007 |
| WO | 2006/081365 A2 | 8/2006 |
| WO | 2006/092778 A1 | 9/2006 |
| WO | WO 2007/076671 A1 * | 7/2007 .............. H04L 12/56 |

OTHER PUBLICATIONS

International Search Report issued in corresponding PCT Application No. PCT/CN2008/072737; mailed Dec. 18, 2008.

(Continued)

*Primary Examiner* — M. R. Sedighian
(74) *Attorney, Agent, or Firm* — Brinks Gilson & Lione (57) ABSTRACT

A method for optical network termination (ONT) configuration is provided. The method includes: obtaining, by an optical line terminal (OLT), service types supported by an ONT and management methods available for each of the service types; and negotiating, by the OLT, with the ONT according to the management methods available for each of the service types, so as to determine a management method to be adopted for each of the service types, and configuring the ONT according to the determined management method.

19 Claims, 4 Drawing Sheets

(56) References Cited

OTHER PUBLICATIONS

Written Opinion of the International Searching Authority issued in corresponding PCT Application No. PCT/CN2008/072737; issued Dec. 18, 2008.

Office Action issued in corresponding Chinese Patent Application No. 200710123951.8; issued Jun. 11, 2010.
Extended European Search Report issued in corresponding European Patent Application No. 08843059.0, mailed Apr. 14, 2011.

* cited by examiner

METHOD, SYSTEM AND DEVICE FOR OPTICAL NETWORK TERMINATION CONFIGURATION

CROSS-REFERENCE TO RELATED APPLICATIONS

This application is a continuation of International Application No. PCT/CN2008/072737, filed on Oct. 17, 2008, which claims priority to Chinese Patent Application No. 200710123951.8, filed on Oct. 17, 2007, both of which are hereby incorporated by reference in their entireties.

FIELD OF THE TECHNOLOGY

The present invention relates to the field of optical access technologies, and more particularly to a method, a system, and a device for optical network termination (ONT) configuration.

BACKGROUND OF THE INVENTION

Currently, the broadband access technologies are mainly classified into copper wire access technologies (for example, various digital subscriber line (DSL) technologies) and optical access technologies. An access network implemented by the optical access technologies is referred to as an optical access network (OAN).

A passive optical network (PON) technology is a technology for implementing the OAN. The PON technology is an optical access technology for point-to-multipoint transmission. A system architecture of the PON is shown in FIG. 1.

Figure 1:
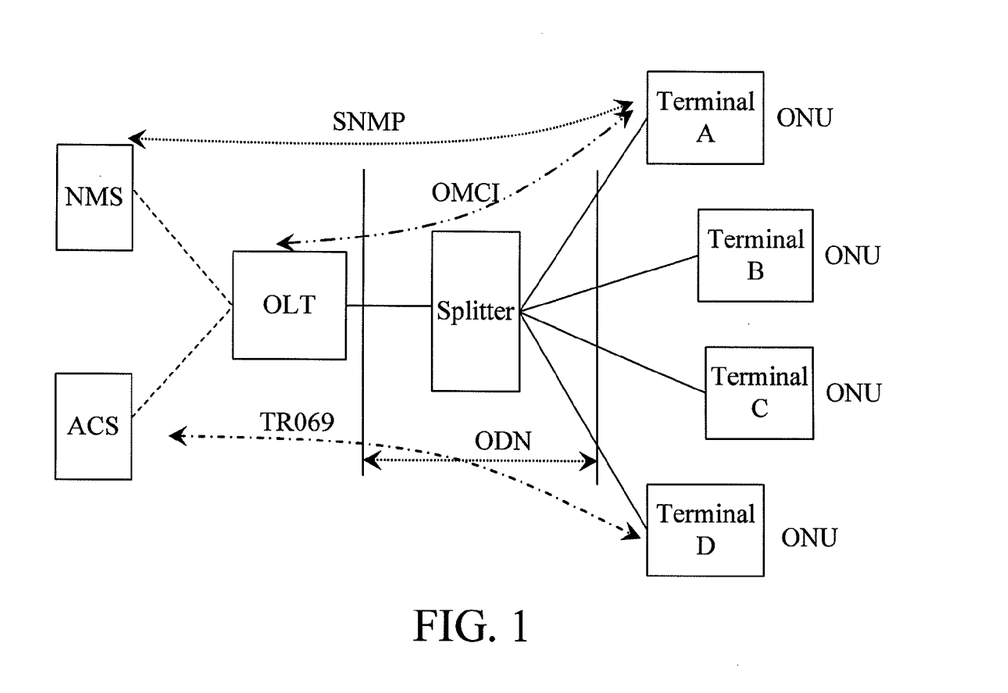
FIG. 1 is a system architectural view of a PON in the prior art.

In FIG. 1, NMS is a network management system, ACS is an automatic configuration server, SNMP is a simple network management protocol, and TR069 is a customer premises equipment wide area network management protocol. An optical line terminal (OLT) is configured to provide a network side interface for the OAN and is connected to one or more optical distribution networks (ODNs). The ODN is a passive optical splitter, and transmits downlink data of the OLT to each optical network unit (ONU) through a splitter, and similarly transmits uplink data of the ONU to the OLT through convergence. The ONU provides a user side interface for the OAN and meanwhile is connected to the ODN. The ONU is referred to as an ONT, if the ONU further provides a user port function, for example, provides an Ethernet user port or a plain old telephone service (POTS) user port. The ONU and the ONT are collectively referred to as ONT herein, if no special description is made.

An ONU management and control interface (OMCI) is a configuration transmission channel defined by the gigabit passive optical network (GPON) standard. The OMCI channel is established between the OLT and the ONT. After being activated, the ONT establishes the OMCI channel between the ONT and the OLT. The OMCI is a master-slave management protocol, in which the OLT is master equipment, the ONT is slave equipment, and the OLT controls a plurality of ONTs connected thereto through the OMCI channels.

The OMCI protocol abstracts various data about ONTs under management of the OLT into a protocol-independent management information base (MIB) with managed entities (MEs) as the basic information units. According to various types of configurations for the ONTs, the OMCI defines that the OLT controls each ME of the ONTs. The ONT implements the configuration management function of each ME under the control of the OLT.

In the PON network, a plurality of management methods is available for the ONTs, for example, a simple OMCI mode and an OMCI+TR069 management method. In actual applications, under the same PON port, an OLT and ONTs are probably produced by different manufacturers, and all the ONTs are probably produced by different manufacturers as well. Therefore, as for a certain service type required by different ONTs, the OLT may adopt different management methods for managing the ONTs depending upon specific situations.

A plurality of management methods is available for a certain specific service when the manufacturer manufactures and produces an ONT, and management methods actually supported by ONTs from different manufacturers are not completely the same. However, in actual applications, a certain service of an equipment can only select one management method according to different demands of operators. In a current GPON network, ONTs from different manufacturers may exist under the same PON port, and management methods of the ONTs for different service configurations are not completely the same. Moreover, a plurality of management methods is available for a certain specific service (for example, the VoIP service may select an OMCI mode for management or select an OMCI+TR069 mode for configuration management). As a result, in the case that ONTs from different manufactures are configured under the same PON port, the OLT cannot figure out the management methods supported by the ONTs in advance, and thus cannot predetermine the management method specifically configured for a certain service of each ONT, and each ONT also cannot notify the OLT about the management method that is adopted to manage a certain service in advance. Thus, it brings a lot of troubles to the configuration and management of the ONTs carried out by the OLT, which severely influences the configuration management efficiency and is disadvantageous for the OLT to configure and manage the ONTs.

SUMMARY OF THE INVENTION

The present invention is directed to a method, a system, and a device for ONT configuration, which are applicable to solve the problems in the prior art that an OLT cannot predetermine a management method specifically configured for a service of each ONT and the ONT cannot notify the OLT about a management method that is adopted to manage a certain service in advance either.

Accordingly, the present invention provides the following technical solutions.

In an embodiment, the present invention provides a method for ONT configuration, which includes the following steps.

An OLT obtains service types supported by an ONT and management methods available for each of the service types.

The OLT negotiates with the ONT according to the management methods available for each of the service types, so as to determine a management method to be adopted for each of the service types, and configures the ONT according to the determined management method.

In an embodiment, the present invention provides a PON system, which includes an OLT and an ONT.

The ONT is configured to send service types supported by the ONT and management methods available for each of the service types to the OLT, and negotiate with the OLT to determine a management method to be adopted for each of the service types.

The OLT is configured to receive the service types supported by the ONT and the management methods available for each of the service types, negotiate with the ONT according to the management methods available for each of the service types, so as to determine the management method to be adopted for each of the service types, and control parameter configuration of the ONT according to the determined management method.

In an embodiment, the present invention provides an OLT, which includes a message sending and receiving unit, a negotiation unit, and a control unit.

The message sending and receiving unit is configured to receive service types supported by an ONT and management methods available for each of the service types that are sent by the ONT.

The negotiation unit is configured to negotiate with the ONT according to the management methods available for each of the service types, so as to determine a management method to be adopted for each of the service types.

The control unit is configured to control parameter configuration of the ONT according to the determined management method.

In an embodiment, the present invention provides an ONT, which includes a message sending and receiving unit, a negotiation unit, and a configuration unit.

The message sending and receiving unit is configured to send service types supported by the ONT and management methods available for each of the service types to an OLT.

The negotiation unit is configured to negotiate with the OLT to determine a management method to be adopted for each of the service types.

The configuration unit is configured to obtain configuration parameters corresponding to the determined management method and configure the ONT.

In the embodiments of the present invention, an OLT obtains service types supported by an ONT and management methods available for each of the service types, and then negotiates with the ONT to determine a management method to be actually adopted for each of the service types. After the ONT negotiates with the OLT to determine the management method for each of the service types, the OLT configures the ONT according to the determined management method, so that the OLT can pre-negotiate with the ONT to determine management methods to be actually adopted for service types. In this way, in the case that ONTs produced by different manufacturers are connected to the same PON port, a corresponding management method can be predetermined for a certain service and the ONT can be configured during the initialization of the network, so as to reduce the burden on the equipment interoperability during the service.

DETAILED DESCRIPTION OF THE EMBODIMENTS

In the technical solutions provided in the embodiments of the present invention, an ONT reports all service types supported by the ONT and management methods available for each service type to an OLT actively or as a response to a request from the OLT, and then, the OLT negotiates with the ONT to determine a management method to be actually adopted for each service type. After the ONT negotiates with the OLT to determine the management method to be adopted for each service type, the OLT configures the ONT.

In order to make the objectives, technical solutions, and advantages of the present invention more comprehensible, the present invention is further described in detail as follows with reference to the embodiments and the accompanying drawings. It should be noted that, the specific embodiments described herein are merely intended to explain the present invention, but not intended to limit the present invention.

Specifically, the requesting, by the OLT, the service types supported by the ONT and the management methods available for each service type from the ONT may be implemented by using an OMCI channel, and the reporting, by the ONT, the service types supported by the ONT and the management methods available for each service type to the OLT actively or as a response to the request from the OLT may be implemented by using an OMCI channel or a physical layer operation, administration, and maintenance (PLOAM) message. Accordingly, the reporting of the service types supported by the ONT and the management methods available for each service type may also be accomplished in other ways.

First, a new ME needs to be defined. The content of the ME is a collection of service types supported by the ONT and management methods available for each service type, and the content of the ME is reported by the ONT to the OLT actively or as a response to a request from the OLT. The ME includes at least two attributes as follows:

1. A list of numbers of all service types supported by the ONT;

2. A list of numbers of all management methods available for each service type.

In the case that the ONT actively reports the content of the ME, the basic process is as follows.

1. A new ME is defined, which may be referred to as "a collection of service types supported by the ONT and management methods available for each service type". The content of the ME is a collection of all services supported by the ONT and all management methods available for each service. The specific attributes should include the following several list data structures:

All services supported by the ONT;

Various management methods available for each service supported by the ONT;

A status indication for management method negotiation, indicating whether a negotiation is being performed about a management method to be adopted for a certain service type;

A pointer pointing to an address of a parameter configuration value database corresponding to the management method;

A configuration status indication, indicating whether relevant parameters of the ONT are being configured according to a certain selected management method.

2. At the system initialization stage, the ONT actively reports the collection of service types supported by the ONT and management methods available for each service type (that is, a list of services supported by the ONT and all corresponding management methods) to the OLT. The reporting operation may be performed via an attribute value change (AVC) message in the OMCI standard. Upon receiving the AVC message, the OLT can know the collection of service types supported by the ONT and management methods available for each service type.

3. The OLT negotiates with the ONT to determine the management method to be actually adopted for each service type one by one according to the service types supported by the ONT and the management methods available for each service type that are reported by the ONT.

4. The OLT reads parameter configuration values corresponding to the determined management method from the parameter configuration value database according to a negotiation result of both parties, and configures parameters of the ONT.

When the OLT requests the collection of service types supported by the ONT and management methods available for each service type from the ONT, the basic process is as follows.

1. A new ME is defined, which may be referred to as "service types supported by the ONT and management methods available for each service type". The content of the ME is a collection of all service types supported by the ONT and management methods available for each service type. The specific content included in the ME is the same as that of the ME in the case that the ONT actively reports the content of the ME.

2. The OLT requests the service types supported by the ONT and the management methods available for each service type through a get operation, or requests the ONT to start MIB upload, so that the ONT reports the collection of service types supported by the ONT itself and management methods corresponding to each service type.

3. The OLT negotiates with the ONT to determine a management method to be actually adopted for each service type according to the service types supported by the ONT and the management methods available for each service type that are reported by the ONT.

4. The OLT reads parameter configuration values corresponding to the determined management method from the parameter configuration value database according to a negotiation result of both parties, and configures parameters of the ONT.

In the embodiment of the present invention, the OLT requests a collection of service types supported by the ONT and management methods available for each service type from the ONT through, for example, a get operation. The OLT may request the collection of the service types supported by the ONT and the management methods available for each service type from the ONT in other ways or the ONT actively reports the collection of the service types supported by the ONT and the management methods available for each service type to the OLT, which have the same basic principle as that in the embodiment of the present invention, and can be accomplished by persons of ordinary skill in the art without making creative efforts and will not be described herein.

Specifically, the following ME: ONT service management type, may be defined first, which is configured to describe a collection of service types supported by the ONT and management methods available for each service type. The ONT Service Management Type ME includes the following key attribute fields, as shown in Table 1.

TABLE 1

List of Key Attributes of ONT Service Management Type ME

| | |
|---|---|
| ME ID | The attribute provides a unique number for an instance of each ME. The entity has only one instance with the number of 0x0000. |
| Available Service Type | List of all service types supported by the ONT and numbers thereof |
| Available Service Corresponding Management Type | List of management methods available for each service type supported by the ONT |

TABLE 1-continued

List of Key Attributes of ONT Service Management Type ME

| | |
|---|---|
| Management Negotiation State | Status indication for the negotiation between the OLT and the ONT about a management method configured for a certain service |
| Service Management Method Used | Management method actually configured for the ONT for a certain service according to a negotiation result between the OLT and the ONT |
| Management Configuration related pointer | Once the management method to be configured for the ONT is determined according to the negotiation result of both parties, the pointer points to an address of a configuration database corresponding to the determined management method, so as to configure relevant attributes of the ONT |
| Management Configuration State | Status indication for parameter configuration when the OLT configures the management method for a certain service supported by the ONT according to the negotiation result |
| . . . | . . . |

Figure 2:
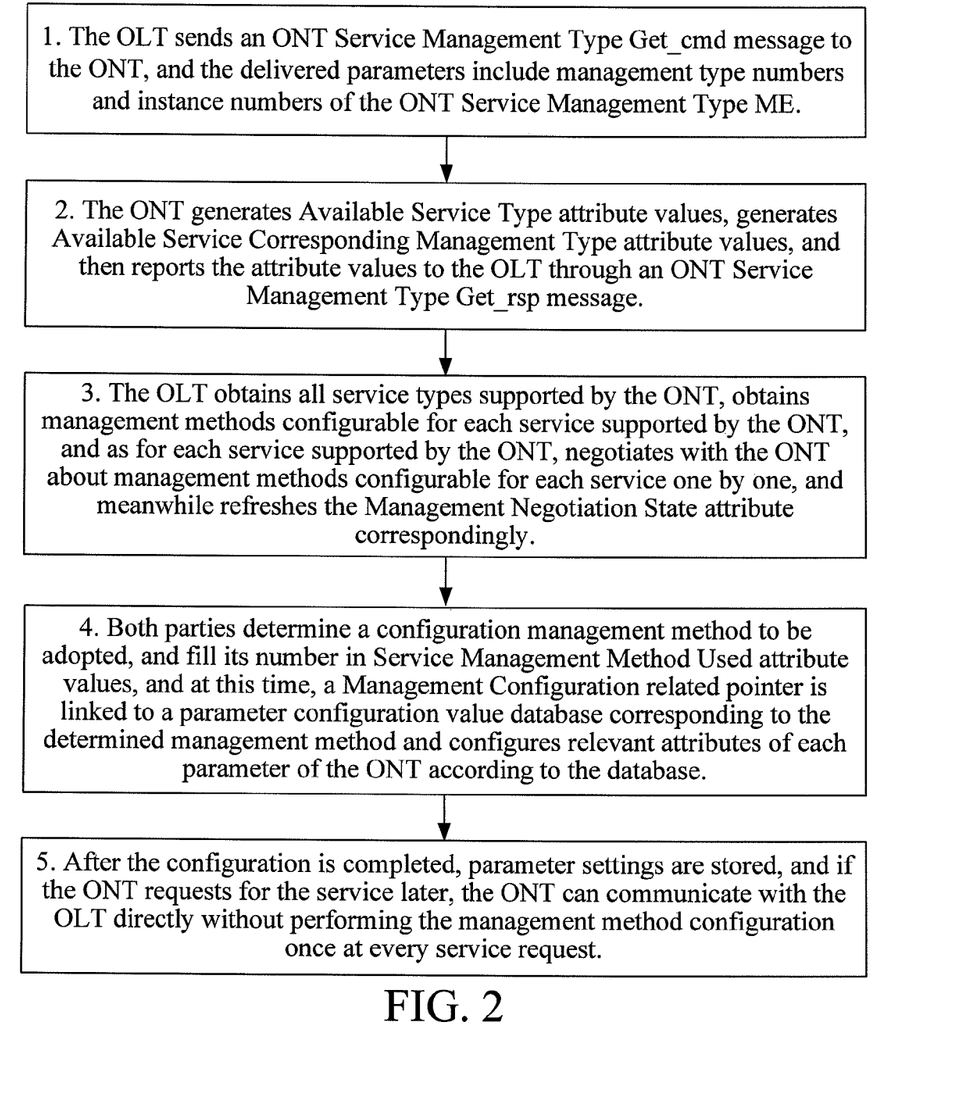
FIG. 2 is a flow chart of a configuration method according to an embodiment of the present invention.

As shown in FIG. 2, the process in the embodiment of the present invention specifically includes the following steps.

1. The OLT sends an ONT Service Management Type Get_cmd message to the ONT, and the delivered parameters include management type numbers and instance numbers of the ONT Service Management Type ME. The management type number is a code number for each management type. For example, the number of OMCI is 1, and the number of SNMP is 2.

2. After receiving the ONT Service Management Type Get_cmd message sent by the OLT, the ONT generates Available Service Type attribute values according to its own hardware configuration, and generates Available Service Corresponding Management Type attribute values according to its own software configuration, and then reports the attribute values to the OLT through an ONT Service Management Type Get_rsp message.

3. The OLT obtains all service types supported by the ONT by reading the Available Service Type attribute values, obtains management methods configurable for each service supported by the ONT through the Available Service Corresponding Management Type attribute values, and as for each service supported by the ONT, negotiates with the ONT about management methods available for each service one by one to inquire whether the ONT supports the configuration of the management method, and meanwhile refreshes the Management Negotiation State attribute correspondingly.

4. Both parties determine a management method to be actually adopted for each service type according to actual scenarios and connections, and then fill the number of the selected management method in Service Management Method Used attribute values, and at this time, a Management Configuration related pointer is linked to a parameter configuration value database corresponding to the selected management method, and relevant attributes of each parameter of the ONT are configured according to the database, and the Management Configuration State is refreshed correspondingly at the same time when each parameter is configured.

5. After the configuration is completed, parameter settings are stored, and if the ONT requests the service later, the ONT can communicate with the OLT directly without performing the management method configuration once at every service request.

As described above, the OLT pre-negotiates with the ONT about a management method to be actually adopted for each service. Thus, when the ONTs produced by different manufacturers are connected to the same PON port, management methods to be actually adopted can be determined for service types supported by the ONT, and the ONT is configured according to the management method to be actually adopted. After the configuration is completed, parameter settings are stored, and if the ONT requests the service later, the ONT can communicate with the OLT directly without performing management method configuration once at every service request, which reduces the burden on the equipment interoperability during the service.

A network system is provided in an embodiment of the present invention, which includes an OLT and an ONT.

The ONT is configured to send a message carrying service types supported by the ONT and management methods available for each of the service types to the OLT, and negotiate with the OLT to determine a management method to be adopted for each of the service types.

The OLT is configured to receive the service types supported by the ONT and the management methods available for each of the service types, negotiate with the ONT according to the management methods available for each of the service types, so as to determine the management method to be adopted for each of the service types, and control parameter configuration of the ONT according to the determined management method.

The service types supported by the ONT and the management methods available for each of the service types that are sent to the OLT are specifically Available Service Type attribute values and Available Service Corresponding Management Type attribute values of an ME. The Available Service Type attribute values represent the service types supported by the ONT, and the Available Service Corresponding Management Type attribute values represent the available management methods corresponding to each of the service types supported by the ONT.

Preferably, the ONT is further configured to generate the Available Service Type attribute values and the Available Service Corresponding Management Type attribute values.

Preferably, the OLT is further configured to send a request message to the ONT to request the service types supported by the ONT and the management methods corresponding to each of the service types from the ONT.

Figure 3:
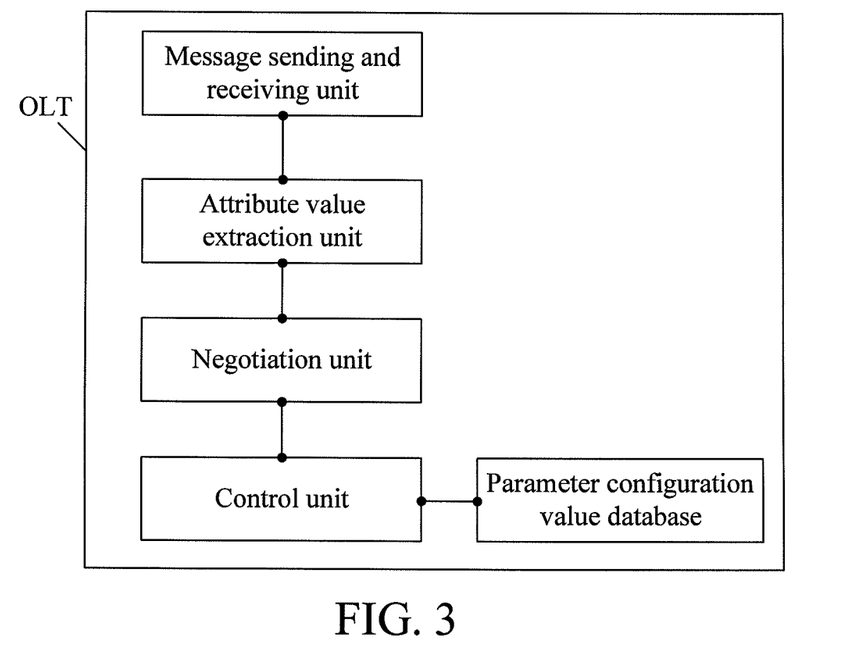
FIG. 3 is a structural view of an OLT according to an embodiment of the present invention.

Referring to FIG. 3, an OLT is provided in an embodiment of the present invention, which includes a message sending and receiving unit, a negotiation unit, and a control unit.

The message sending and receiving unit is configured to receive service types supported by an ONT and management methods available for each of the service types that are sent by the ONT.

The negotiation unit is configured to negotiate with the ONT according to the management methods available for each of the service types, so as to determine a management method to be adopted for each of the service types.

The control unit is configured to control parameter configuration of the ONT according to the determined management method.

Specifically, the message sending and receiving unit is configured to send an ONT Service Management Type Get_cmd message carrying an ONT Service Management Type ME to the ONT, and receive an ONT Service Management Type Get_rsp message carrying values of key attributes of the ONT Service Management Type ME fed back from the ONT.

The OLT further includes an attribute value extraction unit configured to extract Available Service Type attribute values from the ONT Service Management Type Get_rsp message to obtain all services supported by the ONT, and extract Available Service Corresponding Management Type attribute values from the ONT Service Management Type Get_rsp message to obtain management methods corresponding to each service supported by the ONT.

Specifically, as for each service supported by the ONT, the negotiation unit is configured to negotiate with the ONT about management methods available for each service one by one to inquire whether the ONT supports the configuration of the management method, and determine a management method to be actually adopted for each service type according to actual scenarios and connections.

Specifically, the control unit includes a data reading unit and a parameter sending unit.

The data reading unit is configured to read, after the management method to be actually adopted is determined, parameter configuration values corresponding to the determined management method from a parameter configuration value database and transmit the parameter configuration values to the parameter sending unit. The parameter sending unit is configured to send a message carrying the parameter configuration values to the ONT.

The parameter configuration value database is configured to store parameter configuration values corresponding to management methods.

Figure 4:
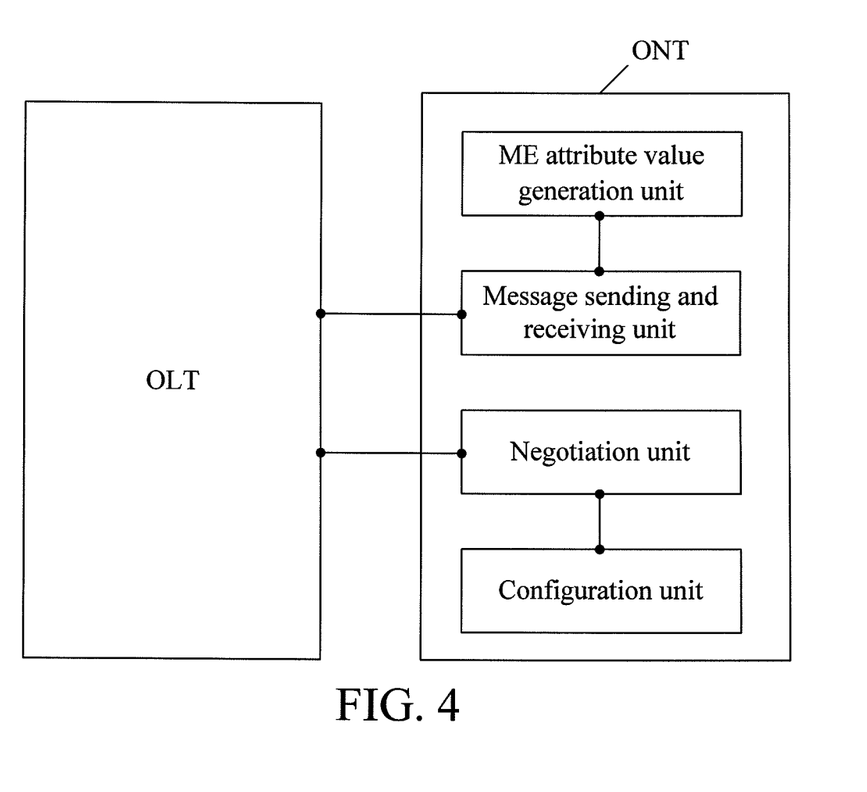
FIG. 4 is a structural view of an ONT according to an embodiment of the present invention.

Referring to FIG. 4, an ONT is provided in an embodiment of the present invention. In order to clearly show the connection relations among units of the ONT, FIG. 4 also shows an OLT. Specifically, the ONT includes a message sending and receiving unit, a negotiation unit, and a configuration unit.

The message sending and receiving unit is configured to send service types supported by the ONT and management methods available for each of the service types to the OLT.

The negotiation unit is configured to negotiate with the OLT to determine a management method to be adopted for each of the service types.

The configuration unit is configured to obtain configuration parameters corresponding to the determined management method and configure the ONT.

Specifically, the message sending and receiving unit is configured to receive an ONT Service Management Type Get_cmd message sent by the OLT, and send an ONT Service Management Type Get_rsp message carrying Available Service Type attribute values and Available Service Corresponding Management Type attribute values in an ONT Service Management Type ME to the OLT.

The ONT further includes an ME attribute value generation unit.

The ME attribute value generation unit is configured to generate Available Service Type attribute values representing the service types supported by the ONT and generate Available Service Corresponding Management Type attribute values representing the management methods corresponding to each service type supported by the ONT. Specifically, the Available Service Type attribute values are generated according to the hardware configuration of the ONT, and meanwhile, the Available Service Corresponding Management Type attribute values are generated according to the software configuration of the ONT. The message sending and receiving unit sends a message carrying the Available Service Type attribute values and the Available Service Corresponding Management Type attribute values to the OLT.

Specifically, the negotiation unit is configured to negotiate with the OLT to determine a management method to be actually adopted for each service type. The configuration unit is configured to configure relevant attributes of each parameter of the ONT according to the configuration parameters sent by the OLT.

As described above, during the initialization of the network, an ONT reports all service types supported by the ONT and management methods corresponding to each service type to an OLT through an ME, and the OLT pre-negotiates with the ONT about a management method to be actually adopted for each service according to the service types and the management methods corresponding to each service type that are reported by the ONT. Thus, when the ONTs produced by different manufacturers are connected to the same PON port, management methods to be actually adopted can be determined for service types supported by the ONT, and the ONT is configured according to the management method to be actually adopted. After the configuration is completed, parameter settings are stored, and if the ONT requests the service later, the ONT can communicate with the OLT directly without performing management method configuration once at every service request, which reduces the burden on the equipment interoperability during the service.

The ONT and the ONU are collectively referred to as ONT in the embodiments of the present invention, so that the technical solutions provided in the embodiments of the present invention are also applicable to the ONU, and the principles are the same, which will not be described herein.

The above descriptions are merely some exemplary embodiments of the present invention, but not intended to limit the scope of the present invention. Any modification, equivalent replacement, or improvement made without departing from the spirit and principle of the present invention should fall within the scope of the present invention.

What is claimed is:

1. A passive optical network (PON) system, comprising: an optical line terminal (OLT) and an optical network termination (ONT), wherein
    the ONT is configured to send an attribute value change (AVC) message reported by the ONT at a system initialization stage, the AVC message comprising the collection of service types supported by the ONT and management methods available for each service type to the OLT, and negotiate with the OLT to determine a management method to be adopted for each of the service types; and
    the OLT is configured to receive the AVC message, negotiate with the ONT according to the management methods available for each of the service types in the AVC message, so as to determine the management method to be adopted for each of the service types, and control parameter configuration of the ONT according to the determined management method.

2. The system according to claim 1, wherein
    the service types supported by the ONT and the management methods available for each of the service types that are sent to the OLT are Available Service Type attribute values and Available Service Corresponding Management Type attribute values of a managed entity (ME); and
    the Available Service Type attribute values represent the service types supported by the ONT, and the Available Service Corresponding Management Type attribute values represent the available management methods corresponding to each of the service types supported by the ONT.

3. The system according to claim 2, wherein
    the ONT is further configured to generate the Available Service Type attribute values and the Available Service Corresponding Management Type attribute values.

4. The system according to claim 1, wherein
    the OLT is further configured to send a request message to the ONT to request the service types supported by the ONT and the management methods available for each of the service types from the ONT.

5. The system according to claim 1, wherein the management methods available for each of the service types comprise an ONU management and control interface (OMCI) mode and an OMCI plus TR069 mode.

6. An optical line terminal (OLT), comprising: a message sending and receiving unit, a negotiation unit, and a control unit, wherein
    the message sending and receiving unit is configured to receive an attribute value change (AVC) message reported by the ONT at a system initialization stage, wherein the AVC message comprises: service types supported by an optical network termination (ONT) and management methods available for each of the service types that are sent by the ONT;
    the negotiation unit is configured to negotiate with the ONT according to the management methods available for each of the service types in the AVC message, so as to determine a management method to be adopted for each of the service types; and
    the control unit is configured to control parameter configuration of the ONT according to the determined management method.

7. The OLT according to claim 6, wherein the control unit comprises:
    a data reading unit, configured to obtain parameter configuration values corresponding to the determined management method; and
    a parameter sending unit, configured to send a message carrying the parameter configuration values to the ONT.

8. The OLT according to claim 7, further comprising:
    a parameter configuration value database, configured to store parameter configuration values corresponding to the management methods;
    wherein the parameter configuration values obtained by the data reading unit are obtained from the parameter configuration value database.

9. The OLT according to claim 6, wherein the management methods available for each of the service types comprise an ONU management and control interface (OMCI) mode and an OMCI plus TR069 mode.

10. A method for optical network termination (ONT) configuration, comprising:
    receiving, by an Optical Line Terminal (OLT), an attribute value change (AVC) message reported by the ONT at a system initialization stage, wherein the AVC message comprises: the collection of service types supported by the ONT and management methods available for each service type;
    negotiating, by the OLT, with the ONT according to the management methods available for each of the service types in the AVC message, so as to determine a management method to be adopted for each of the service types, and configuring the ONT according to the determined management method.

11. The method according to claim 10, wherein the obtaining, by the OLT, the service types supported by the ONT and the management methods available for each of the service types further comprises:
    sending, by the ONT, the service types supported by the ONT and the management methods available for each of the service types to the OLT actively; or
    obtaining, by the ONT, information indicating that the OLT requests the service types supported by the ONT and the management methods available for each of the service types, and then sending the service types supported by the ONT and the management methods available for each of the service types to the OLT.

12. The method according to claim 11, wherein the sending the service types supported by the ONT and the management methods available for each of the service types to the OLT further comprises:
- sending, by the ONT, Available Service Type attribute values and Available Service Corresponding Management Type attribute values of a managed entity (ME) to the OLT;
- the Available Service Type attribute values represent the service types supported by the ONT, and the Available Service Corresponding Management Type attribute values represent the available management methods corresponding to each of the service types supported by the ONT.

13. The method according to claim 10, wherein the configuring the ONT according to the determined management method further comprises:
- obtaining, by the OLT, parameter configuration values from a parameter configuration value database according to the determined management method; and
- configuring the ONT according to the obtained parameter configuration values.

14. The method according to claim 10, wherein the management methods available for each of the service types comprise an ONU management and control interface (OMCI) mode and an OMCI plus TR069 mode.

15. The method according to claim 14, further comprising:
- defining a managed entity (ME) referred to as a collection of service types supported by the ONT and management methods available for each service type.

16. The method according to claim 15, wherein attributes of the ME comprises:
- Available Service Type, which is a list of all service types supported by the ONT and numbers thereof;
- Available Service Corresponding Management Type, which is a list of management methods available for each service type supported by the ONT;
- Management Negotiation State, which is a status indication for the negotiation between the OLT and the ONT about a management method configured for a certain service;
- Service Management Method Used, which is management method actually configured for the ONT for a certain service according to a negotiation result between the OLT and the ONT;
- Management Configuration related pointer, which points to an address of a configuration database corresponding to a management method, so as to configure relevant attributes of the ONT once the management method to be configured for the ONT is determined; and
- Management Configuration State, which is a status indication for parameter configuration when the OLT configures the management method for a certain service supported by the ONT according to the negotiation result.

17. The method according to claim 15, wherein the obtaining, by an OLT, service types supported by an ONT and management methods available for each of the service types comprises:
- requesting, by the OLT, the service types supported by the ONT and the management methods available for each service type through a GET operation; and
- receiving, by the OLT, the collection of service types supported by the ONT and management methods available for each service type reported by the ONT.

18. The method according to claim 15, wherein the obtaining, by an OLT, service types supported by an ONT and management methods available for each of the service types comprises:
- requesting, by the OLT, the ONT to perform a management information base (MIB) upload; and
- obtaining, by the OLT, the collection of service types supported by the ONT and management methods available for each service type from the MIB uploaded by the ONT.

19. The method according to claim 18, wherein the obtaining, by an OLT, service types supported by an ONT and management methods available for each of the service types comprises:
- sending, by the OLT, an ONT Service Management Type Get_cmd message to the ONT, the message comprising management type numbers and instance numbers of the ONT Service Management Type ME, wherein the management type number is a code number for each management type;
- generating, by the ONT, Available Service Type attribute values related to hardware configuration of the ONT and Available Service Corresponding Management Type attribute values related to software configuration of the ONT;
- reporting, by the ONT, the Available Service Type attribute values and the Available Service Corresponding Management Type attribute values to OLT; and
- obtaining, by the OLT, the service types supported by the ONT from the Available Service Type attribute values, and obtaining, by the OLT, management methods available for each service supported by the ONT from the Available Service Corresponding Management Type attribute values.

* * * * *